(12) United States Patent
Wong et al.

(10) Patent No.: US 10,402,884 B2
(45) Date of Patent: *Sep. 3, 2019

(54) METHODS AND SYSTEMS FOR FACILITATING COMPARISON SHOPPING WITH GEOGRAPHICALLY-SPECIFIC, REAL-TIME PRODUCT INVENTORY INFORMATION

(71) Applicant: eBay Inc., San Jose, CA (US)

(72) Inventors: Jeffrey Wong, Los Altos, CA (US); William R Watt, II, San Jose, CA (US)

(73) Assignee: eBay Inc., San Jose, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 14/745,990

(22) Filed: Jun. 22, 2015

(65) Prior Publication Data

US 2015/0287118 A1  Oct. 8, 2015

Related U.S. Application Data

(63) Continuation of application No. 13/156,816, filed on Jun. 9, 2011, now Pat. No. 9,064,277.

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0627* (2013.01); *G06Q 10/087* (2013.01); *G06Q 30/06* (2013.01); *G06Q 30/0601* (2013.01); *G06Q 30/0639* (2013.01)

(58) Field of Classification Search
CPC ..................... G06Q 30/0601–0645

USPC .............................. 705/26.1–27.2
See application file for complete search history.

(56) References Cited

U.S. PATENT DOCUMENTS

| 9,064,277 B2 | 6/2015 | Wong et al. |
|---|---|---|
| 2002/0026380 A1 | 2/2002 | Su |
| 2007/0124216 A1* | 5/2007 | Lucas .............. G06Q 10/087 705/26.1 |

(Continued)

FOREIGN PATENT DOCUMENTS

WO    WO-2012170809 A1    12/2012

OTHER PUBLICATIONS

By Emily Fredrix, A. P. (Dec. 18, 2009). Shoppers squeeze retailers with smart phone apps. Daily Herald (Arlington Heights, IL) Retrieved from https://dialog.proquest.com/professional/docview/676040574?accountid=142257.*

(Continued)

*Primary Examiner* — Resha Desai
(74) *Attorney, Agent, or Firm* — Schwegman Lundberg & Woessner, P.A.

(57) ABSTRACT

Consistent with some embodiments of the invention, a web-based comparison shopping and marketplace service enables a user to search for and/or browse products of interest, and then obtain geographically-relevant, real-time product availability and pricing information for a product of interest that is offered by one or more physical retail stores. Additionally, with some embodiments, the service enables a user to conclude a purchase transaction for a product that is located at a retail store, and then provides the user with driving directions from the user's location to the retail store.

20 Claims, 5 Drawing Sheets

(56) References Cited

U.S. PATENT DOCUMENTS

| | | | |
|---|---|---|---|
| 2009/0157472 A1* | 6/2009 | Burazin | G06Q 30/02 705/14.57 |
| 2009/0216549 A1* | 8/2009 | Causey | G06Q 30/02 705/26.1 |
| 2010/0113072 A1* | 5/2010 | Gibson | G06Q 20/045 455/466 |
| 2010/0191578 A1 | 7/2010 | Tran et al. | |
| 2012/0316989 A1 | 12/2012 | Wong et al. | |

OTHER PUBLICATIONS

"U.S. Appl. No. 13/156,816, Advisory Action dated Aug. 23, 2013", 3 pgs.

"U.S. Appl. No. 13/156,816, Final Office Action dated Jun. 14, 2013", 18 pgs.

"U.S. Appl. No. 13/156,816, Non Final Office Action dates Sep. 4, 2014", 6 pgs.

"U.S. Appl. No. 13/156,816, Non Final Office Action dated Oct. 11, 2012", 16 pgs "U.S. Appl. No. 13/156,816, Non Final Office Action dated Dec. 17, 2013", 15 pgs.

"U.S. Appl. No. 13/156,816, Notice of Allowance dated Feb. 17, 2015", 14 pgs.

"U.S. Appl. No. 13/156,816, Response filed Jan. 5, 2015 to Non Final Office Action dated Sep. 4, 2014", 14 pgs.

"U.S. Appl. No. 13/156,816, Response filed Apr. 11, 2013 to Non Final Office Action dated Oct. 11, 2012", 11 pgs.

"U.S. Appl. No. 13/156,816, Response filed Jun. 17, 2014 to Non Final Office Action dated Dec. 17, 2013", 14 pgs.

"U.S. Appl. No. 13/156,816, Response filed Aug. 16, 2013 to Final Office Action dated Jun. 14, 2013", 12 pgs.

"International Application Serial No. PCT/US2012/041542, International Preliminary Report on Patentability dated Dec. 27, 2013", 6 pgs.

"International Application Serial No. PCT/US2012/041542, International Search Report dated Aug. 24, 2012", 3 pgs.

"International Application Serial No. PCT/US2012/041542, Written Opinion dated Aug. 24, 2012", 4 pgs.

Chatham, "Target launches first scannable mobile coupon program", frugallstas going wild Newstex, (2010).

* cited by examiner

METHODS AND SYSTEMS FOR FACILITATING COMPARISON SHOPPING WITH GEOGRAPHICALLY-SPECIFIC, REAL-TIME PRODUCT INVENTORY INFORMATION

PRIORITY

This application is a continuation of and claims the benefit of priority to U.S. patent application Ser. No. 13/156,816, filed on Jun. 9, 2011, which is hereby incorporated by reference herein in its entirety.

TECHNICAL FIELD

The present disclosure generally relates to data processing techniques for online commerce. More specifically, the present disclosure relates to methods and systems for facilitating comparison shopping with geographically-specific, real-time product inventory information.

BACKGROUND

A variety of advancements in computer and data networking technologies have given rise to an entire industry of web-based retail stores and marketplaces. The nature and variety of these online stores and marketplaces is almost as diverse as the products and services that can be purchased. One of the many advantages that these online stores and marketplaces provide to consumers, when compared to their brick-and-mortar counterparts, is the ease with which the online stores and marketplaces enable a consumer to comparison shop. For instance, with traditional brick-and-mortar stores, a consumer must visit or call several different stores to obtain availability and pricing information for a particular product or service. Moreover, the consumer must visit the several stores in a relatively small time span, as the availability and price of a product or service may change very quickly. With online stores and marketplaces, a consumer can simply utilize a web browser, or similar application, to navigate to the relevant web pages of several different online stores to observe the availability and pricing information for a product or service of interest. Various online services have made it even simpler to comparison shop by consolidating product information, including prices, such that a consumer can simply perform a product search and instantly be presented with information concerning various online stores offering products that match the terms specified in the product search.

Online comparison shopping in this manner is advantageous in the sense that it makes it easy for a consumer to identify one or more online stores offering a particular product at a desirable price. However, shopping online in this manner still has some drawbacks. First, many online stores publish very low prices to attract traffic to their websites, but for a particular product, the store will have very limited product availability, if any, at the stated low price. Accordingly, conventional comparison shopping services direct user's to online stores with published low prices, but no inventory available. Second, in many instances, a consumer may not be willing to enter into a transaction for a product or service being offered from an online store with which the consumer is not familiar. Finally, when a product is purchased from an online store, the product must be shipped to the consumer (typically by a third party) from a warehouse or other location. This delay that occurs from the time of purchasing the product until receiving the product not only quashes the level of satisfaction felt by the consumer in making the purchase, but in some instances will defeat the very purpose for which the product is being purchased. For example, if the product is meant to be a last minute gift purchase, waiting even one or two days to receive the purchased product may not be a viable option.

DESCRIPTION OF THE DRAWINGS

Some embodiments of the invention are illustrated by way of example and not limitation in the figures of the accompanying drawings, in which.

DETAILED DESCRIPTION

Figure 1:
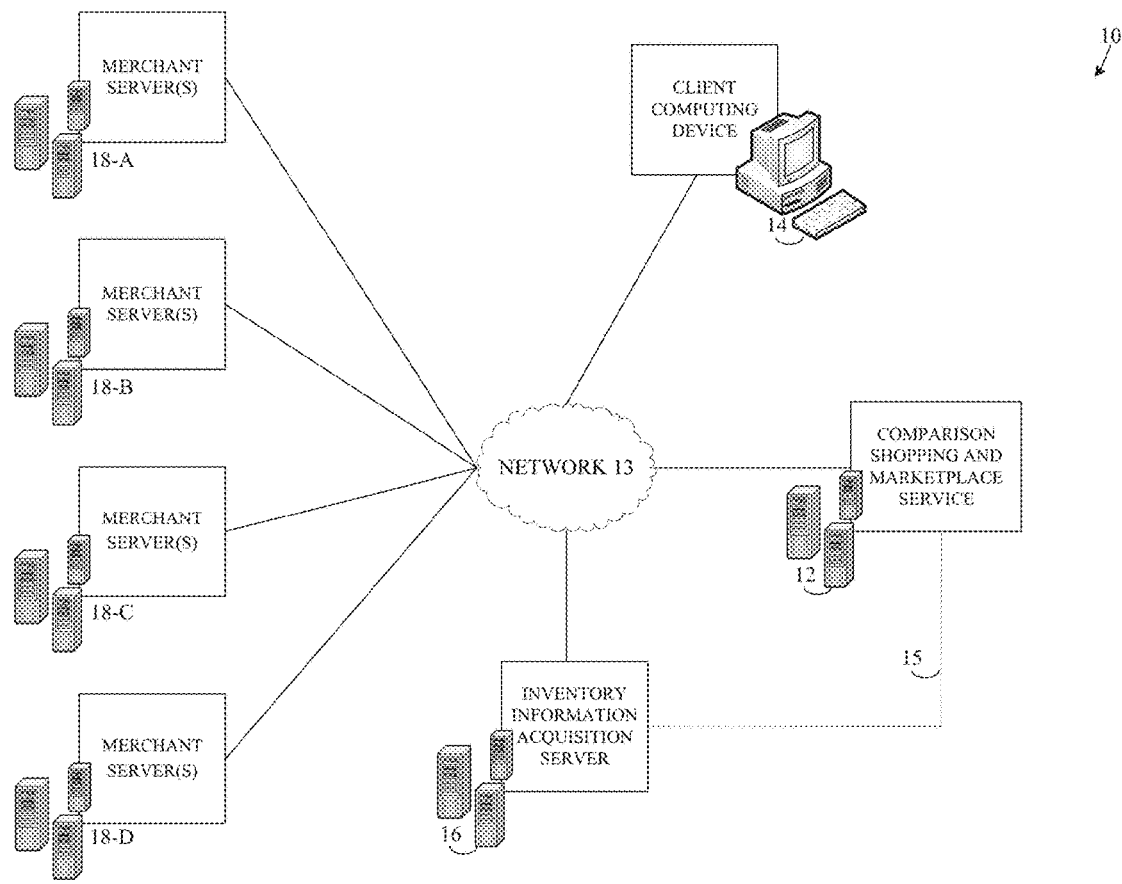
FIG. 1 is a block diagram illustrating a network environment including a server hosting a comparison shopping and marketplace service, consistent with some embodiments of the invention.

The present disclosure describes methods and systems for facilitating comparison shopping with geographically-specific, real-time product inventory information, thereby enabling one to compare prices and locations of products available within a particular geographical region. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Consistent with some embodiments of the invention, a web-based comparison shopping and marketplace service facilitates comparison shopping by obtaining, and then presenting, geographically relevant, real-time product availability information and pricing information for various products offered at different physical retails stores in a geographical area of interest to a user. Specifically, the product inventory information relates to products being offered at competing physical retail stores, for example, that are owned and operated by different entities. Accordingly, a user of the service can search or browse for a product of interest, and then by selecting a product listing for the product, the user can ascertain product availability and pricing information for the product at several different physical retail stores, operated by different (often competing) entities, located in a particular geographical area of interest to the user. For example, if the user is considering going to a local retail store to buy a product, using the web-based comparison shopping service, the user can first ascertain the product availability and pricing information for all stores near the user, or near a user-specified location. Consequently, by using the service, the user will be able to plan a visit to a local retail store that is likely to have the particular product of interest in stock, and at a price deemed satisfactory to the user.

Additionally, with some embodiments, the web-based comparison shopping and marketplace service enables a user to purchase a product, prior to picking the product up from a local retail store. For instance, the web-based comparison shopping and marketplace service enables a user to finalize a transaction by providing payment information, such that, upon completion of the transaction, a message is communicated from the server operating the web-based service to a server associated with the selected retail store indicating that the product has been purchased. In such instances, the user need only visit the retail store to pick up the purchased product. With some embodiments, proof of purchase (e.g., a receipt) or similar information may be communicated to a mobile device of the user so that the user can simply present the proof of purchase information to the appropriate person at the local retail store. Advantageously, the web-based comparison shopping and marketplace service makes it possible for a user, with a single web-based service (e.g., a single website), to identify a product of interest, ascertain product availability and pricing information for the product from several different physical retail stores in a user-specified geographical area, and then complete a purchase transaction for the product. Other advantages and aspects of the present invention will be apparent from the description of the figures that follows.

FIG. 1 is a block diagram illustrating a network environment 10 including one or more server(s) 12 hosting a comparison shopping and marketplace service, consistent with some embodiments of the invention. As illustrated in FIG. 1, using a client computing device 14, a user can access and interact with the comparison shopping and marketplace service hosted on the server(s) with reference number 12. The client computing device may execute a conventional web browser application, or a proprietary application (e.g., a desktop or mobile application or app) that enables access to the marketplace service. Although depicted in FIG. 1 as a desktop computer, the client computing device 14 may be any type of computing device with any one of various form factors, to include a notebook computer, laptop computer, tablet computer, mobile handset, or similar computing device.

As illustrated in FIG. 1, the comparison shopping and marketplace service is configured to exchange data over the network 13 with an inventory information acquisition service, operating on one or more servers 16. In some embodiments, this exchange of data may take place over a public network, such as the Internet, while in other embodiments, a private network (as indicated by the dotted line with reference number 15) may be used. In still other embodiments, a virtual private network (VPN) may be established over an otherwise public network, thereby offering a level of security for communications between the services. In any case, as a user interacts with the marketplace service by browsing and/or searching for products of interest, the marketplace service may poll (e.g., pull) the inventory information acquisition service 16 for product inventory information in real time. In other embodiments, the inventory information acquisition service will automatically communicate (e.g., push) product inventory information to the marketplace service in real time, or on a periodic basis. In general, the product inventory information represents the available product inventory for various products offered at physical retail stores in a particular geographical location. As such, the user may be presented with real-time product availability and pricing information for a product being offered in retail stores in a geographical area of interest to the user.

With some embodiments, the marketplace service may exclusively present information about products and/or services that are being offered by various merchants and service providers operating physical retail stores—that is, to the exclusion of product information for products available only from online retailers or marketplaces. Specifically, the product inventory information that is presented may be for multiple different merchants operating different retail stores at different locations. As such, when a user performs a search for a product, the information presented to the user may include information from any number of physical retail stores, such as Target®, Walmart®, Sears®, Best Buy®, and so forth. With some embodiments, the marketplace service may provide and present information about products, items and services that are being offered offline, for example, at physical retail stores, as well as online at various web-based retail stores and marketplaces. With such embodiments, one or more traditional auction listing services and/or classified listing services may be integrated to operate in conjunction with the comparison shopping and marketplace service. Accordingly, with a single search query, the user may be presented with a variety of search results of different types (e.g., classified listings, auction listings, online only listings, offline only listings, and so forth). The search results may be integrated in any number of ways, and may allow for filtered viewing, such that a user can quickly and easily filter the search results based on any number of attributes to include: online or offline stores, locations (e.g., within a set distance of a particular location), price, product availability, payment options offered, and so forth.

With some embodiments, the inventory information acquisition server 16 uses a variety of mechanisms to obtain product inventory information for a variety of products being offered at various retail stores. For instance, with some embodiments, the inventory information acquisition server 16 uses automated bots or scripts to obtain and analyze product availability and pricing information from servers 18-A through 18-D, which are associated with various merchants operating physical retail stores. In other instances, the inventory information acquisition server 16 may simply communicate a request (e.g., an application programming interface (API) request) to the appropriate service to ascertain product inventory information for certain retailers. Once obtained, the product inventory information may be stored in a cache available to the inventory information acquisition server 16. As such, when the inventory information acquisition server 16 receives a request for information from the marketplace server 12, the inventory information acquisition server 16 can first ascertain whether the requested information is both stored in the cache, and current. If it is, the inventory information acquisition server 16 can process the request without polling in real time for inventory information. However, if the requested information is either not stored in the cache, or is stale (e.g., out dated), then the inventory information acquisition server 16 will perform any number of parallel data acquisition operations to obtain the product inventory information from various merchant servers.

With some embodiments, the marketplace service may have its own cache for storing product inventory information that is received from the inventory acquisition server 16. As such, at least with some embodiments, two levels of caching may be implemented. Accordingly, when a user performs a search for a particular product, real-time product inventory information may be obtained from the inventory acquisition server 16. This information may be cached locally at the marketplace service (e.g., server(s) with reference number 12) so that a response to a subsequent search for the same product can be serviced with information stored in the cache.

Figure 2:
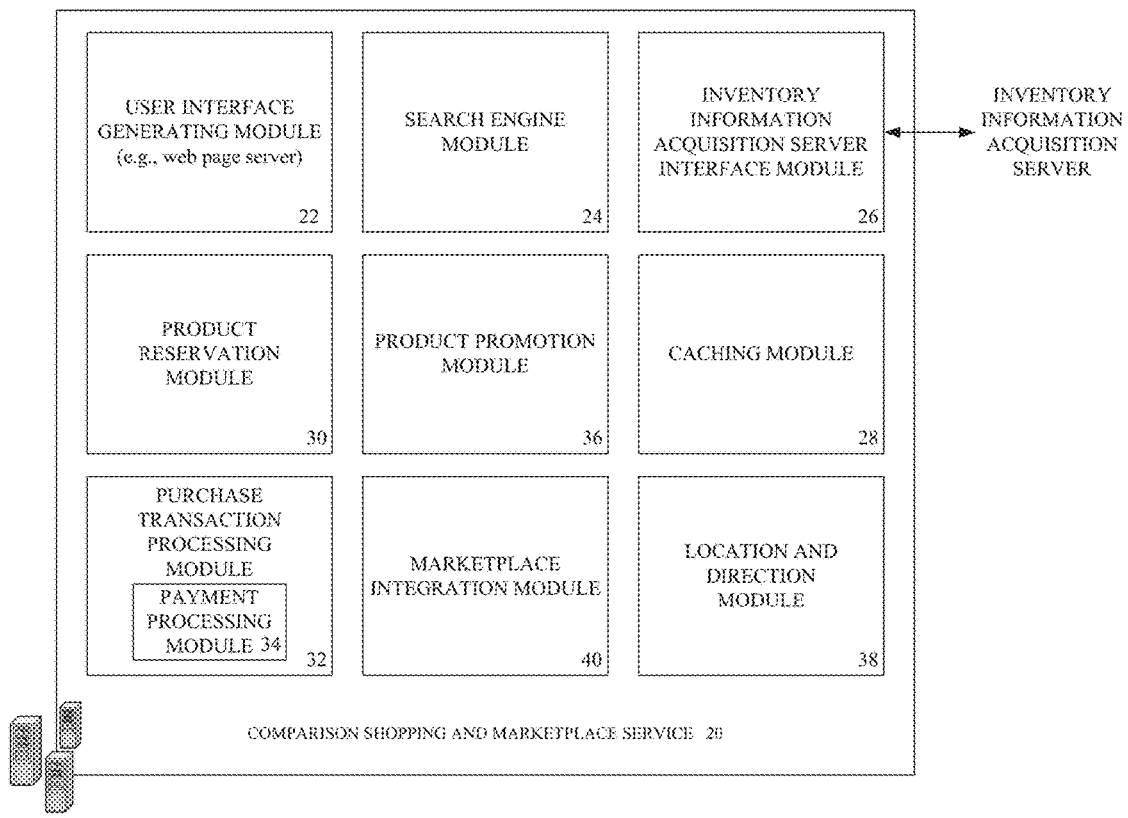
FIG. 2 is a block diagram illustrating various functional modules of a comparison shopping and marketplace service, consistent with some embodiments of the invention.

FIG. 2 is a block diagram illustrating various functional modules of a comparison shopping and marketplace service 20, consistent with some embodiments of the invention. These modules may be implemented as software, hardware, or a combination of software and hardware. For instance, with some embodiments, these modules may be implemented as a set of software instructions for execution on one or more processors (e.g., such as general purpose computer processors or application-specific circuits). The modules shown in FIG. 2 may reside on a single server or multiple servers, and may be combined in various combinations, which may include other components not explicitly shown in FIG. 2, or without some of the components shown in FIG. 2.

As illustrated in FIG. 2, the comparison shopping and marketplace service 20 includes a user interface generating module (e.g., web page server) 22, a search engine module 24, and an inventory information acquisition server interface 26. In general, the user interface generating module 22 operates in conjunction with a network interface (not shown) to receive and respond to client requests. Specifically, the user interface generating module 22 operates in conjunction with the search engine module 24 to enable a user to perform a search for products of interest, or simply to browse the various products being offered via the marketplace service 20. The inventory information acquisition server interface 26 facilitates communications over a network with one or more inventory information acquisition servers. As such, with some embodiments, the interface 26 facilitates requests and receives product inventory information from a centralized inventory information acquisition server, which itself obtains product inventory information from any number of servers. With some embodiments, the interface 26 may operate to poll for product inventory information in real time, as client requests are received and processed. In other embodiments, the interface 26 may operate in a background mode so as to periodically poll the inventory information acquisition server for product inventory information. In yet other embodiments, the interface 26 may periodically receive the product inventory information from the inventory information acquisition server without polling for the information. With some embodiments, any combination or mix of these data acquisition methods may be implemented.

The comparison shopping and marketplace service 20 includes a caching module 28 for caching product inventory information received from the inventory information acquisition service. Accordingly, with some embodiments, when processing a particular client request, the marketplace service may first assess whether product inventory information satisfying a particular query resides within a cache managed by the caching module 28. If so, the request may be processed and a response generated using locally available product inventory information—that is, product inventory information stored in a local cache. If not, a real time request may be communicated via the interface 26 to the product inventory acquisition service for product inventory information satisfying the particular query.

With some embodiments, a user can select a particular listing from a set of search results presented in a search results page to obtain more detailed information about a particular product offering. In addition, the service enables a user to complete a purchase transaction for the item, and make the appropriate payment. With some embodiments, a user may be able to reserve the product for a subsequent pick-up at a store of his or her choosing. Accordingly, the marketplace service 20 includes a purchase transaction processing module 32 and a product reservation module 30 that facilitates transactions involving the purchase or reservation of a product at a particular physical retail store. With some embodiments, the product reservation module 30 is configured to communicate with one or more external servers (e.g., merchant server 18) operated by the various retailers from which products are being offered. For instance, with some embodiments, a reservation request message may be communicated from the marketplace service 20 to a server operated by a retailer. The reservation request message may specify various information concerning a reservation request transaction, such as a product identifier that identifies the product being reserved, information about an optional reservation payment (if any) that has been processed by the marketplace service 20, a quantity of items reserved, and so forth. Upon receiving a confirmation message from the merchant server, the marketplace service communicates the appropriate information to the client computing device of the user to inform the user of the successful reservation.

With some embodiments, a purchase transaction processing module 32 facilitates the actual purchase of a product from any of a number of retail stores. Similar to the product reservation module 30, the purchase transaction processing module 32 communicates a purchase request message to a merchant server, conveying the appropriate information to ensure that the user-selected item is set aside for the user who has purchased the item. As illustrated in FIG. 2, a payment processing module 34 is included as part of the purchase transaction processing module 32. The payment processing module 34 may facilitate a payment processing service, or in some embodiments, may serve as an interface to an external payment processing service. In any case, the payment processing module 34 operates in conjunction with the purchase transaction processing module 32 to present a user with the appropriate user interface and to prompt for and obtain payment information that can be processed to complete a transaction for an item or service. With some embodiments, the payment processing module 34 may operate in conjunction with the product reservation module 30 to allow an optional (at a merchant's discretion) payment in exchange for reserving a product.

The comparison shopping and marketplace service 20 includes a product promotion module 36 and a location and direction module 38. With some embodiments, the product promotion module 36 facilitates the communication to users of advertisements, coupons, deals, or other promotional offers. In particular, the product promotion module 36 may analyse the collective searching, browsing and purchase information (e.g., historical user-behaviour information) of all users of the system to make product recommendations to users. In certain instances, a particular merchant may partner with the operator of the marketplace service 20 to enable the merchant to specifically target users under certain scenarios with promotional offerings from the retails stores of the merchant. With some embodiments, an application residing on a user's mobile client device may serve as an agent to a location-based service that allows the marketplace service 20 to communicate promotional offers to users when the users are determined to be in particular locations. For instance, if a user makes a purchase via the marketplace service 20 and then travels to a particular location of a physical retail store to pick up the purchased item, the user's location at the store may be detected by the agent residing on the user's mobile phone. The location information may be reported to the product promotion module, which may then communicate a message to the user via his or her mobile computing device. The message may be a promotional offer, coupon, advertisement or similar type of message, and may provide information about a product that is complementary to a product that the user has already purchased. As such, the partnering merchant may attempt to increase its sales by offering promotions that are both sensitive to time and location (e.g., when the user is visiting the merchant's store).

With some embodiments, the location and direction module 38 generates information useful in generating driving instructions (e.g., turn-by-turn directions) for use by a user in traveling from a location of the user to a physical retail store. This is particularly useful, for example, when a user makes a purchase from a particular retail store that the user is not familiar with. The location and direction module can either automatically ascertain the user's present location, for instance, by analysing a user's profile information (if available), inferring the location based on some other information, such as the Internet Protocol (IP) address of the user's client computing device, by receiving location information from an agent process residing and executing on a location-aware mobile device, or by any other means. Once the user's location is determined, the location and direction module may communicate an interactive map, or simply turn-by-turn textual directions, to a computing device of the user. The map and/or directions may be displayed at any time during a user's session with the marketplace service. For example, if the user selects a product listing associated with a particular physical retail store, the service may present the user with detailed information about the product along with a map and/or directions indicating the location of the user relative to the store. Similarly, if a user makes a purchase of a product from a particular physical retail store, the location and direction module 38 may present the user with a map, and turn-by-turn directions to the physical store at which the purchase was made.

As shown in FIG. 2, the comparison and shopping marketplace service 20 includes a marketplace integration module 40. With some embodiments, the marketplace integration module 40 allows users of a conventional marketplace application to receive additional search results including product listings for products available at physical retail stores in a particular location determined to be near the location of the user.

Figure 3:
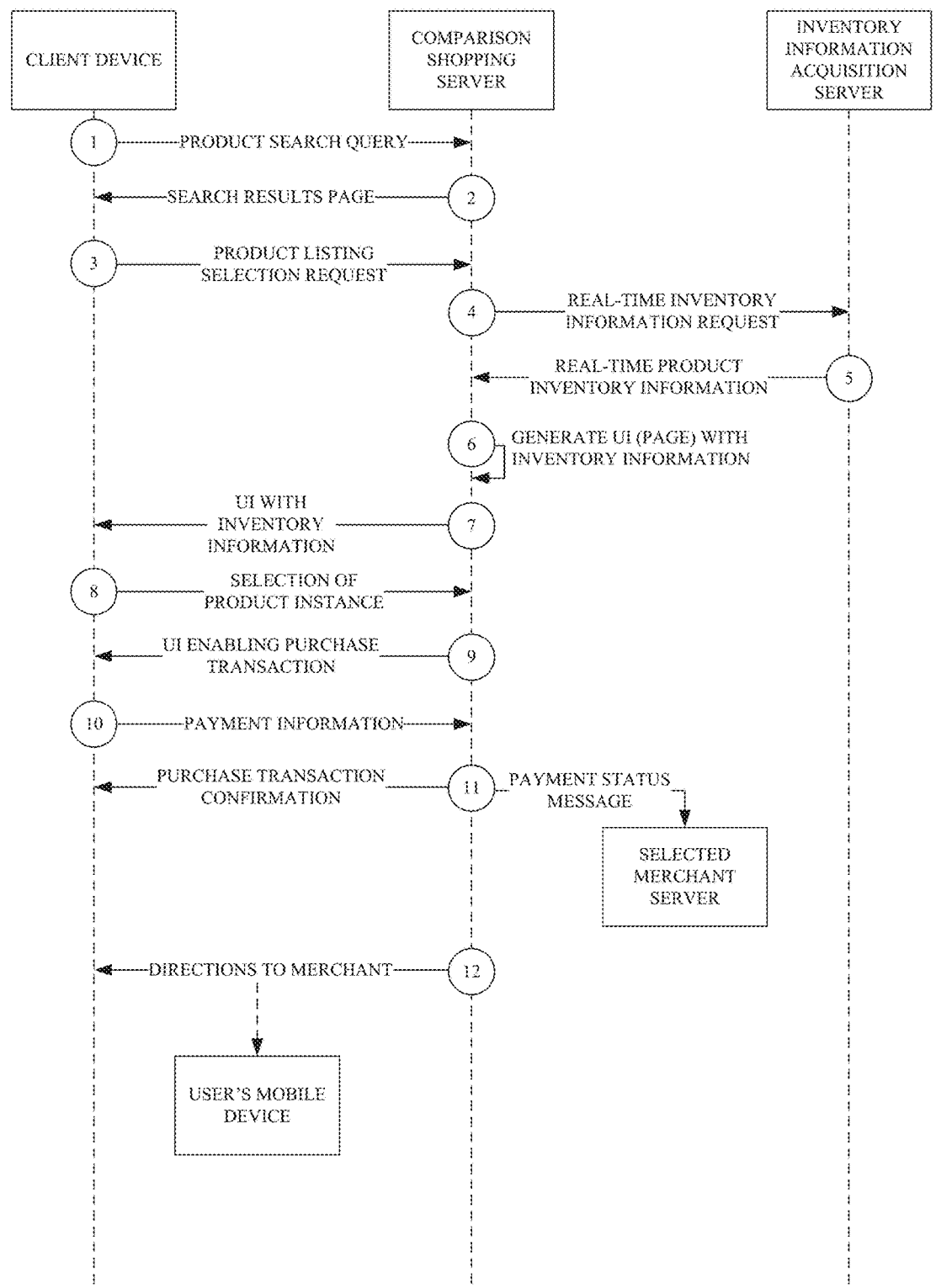
FIG. 3 is a flow diagram illustrating an example of method operations, and corresponding data flow, of a method to facilitate comparison shopping, according to some embodiments of the invention.

FIG. 3 is a flow diagram illustrating an example of the data flow, and method operations, of a method to facilitate comparison shopping, according to some embodiments of the invention. As illustrated in FIG. 3, at method operation 1, a client device communicates a product search query to a server operating or executing a comparison shopping and marketplace service. The product search query may be generated in any number of ways, including free-form text input into a search text input box, or by a user selecting various graphical user interface elements, for example, to specify certain attributes of a desired product, item or service. Next, as indicated by the method operation with reference number 2, the comparison shopping and marketplace service receives and processes the product search query, and returns to the client device one or more search results pages. The search results pages may display an overview or brief summary of the products that satisfy the user-specified search query.

Next, as indicated by reference number 3, a user viewing the search results page selects a particular product listing, which in turn, generates a request (e.g., a product listing selection request) that is communicated from the client device to the marketplace service. In turn, the marketplace service receives and processes the request. For example, as indicated by reference number 4, the comparison shopping service generates a real-time inventory information request that is communicated to the inventory information acquisition server. This request may, for example, specify a location and a product identifier, thereby enabling the inventory information acquisition server to identify and respond with product inventory information for those physical retail stores within a specified range of the location specified in the request. Accordingly, as indicated by reference number 5, the inventory information acquisition server processes the inventory information request, and responds with real-time product inventory information. With some embodiments, the inventory information acquisition server will maintain a cache, such that the request may be processed with data stored in the cache, if present and current in the cache. Otherwise, the inventory information acquisition server may query or poll one or more other (e.g., merchant) servers to obtain the information that is required to respond to the particular inventory information request. With some embodiments, the inventory information request may specify, in addition to a particular location, a distance from the location that is to be searched (e.g., 5 miles, 10 miles, 25 miles, etc.). Accordingly, the response may include product inventory information for physical retail stores that are located within the particular distance of the specified location.

As indicated by reference number 6, when the comparison shopping and marketplace service receives the real-time product inventory information from the inventory information acquisition server, the marketplace service generates the appropriate user interface information (e.g., web page) for presentation to the user. At the operation with reference number 7, the shopping service communicates the appropriate user interface information, including the product inventory information, to the requesting client device.

At method operation 8, a user manipulates the user interface to select a particular product that is indicated as being available at a particular price from a particular physical retail store. For instance, a user may use his or her mouse or other cursor pointing device to review the product information and make a selection of a particular instance of a product available from a particular physical retail store. In turn, the client device communicates information indicating the user's product selection to the server operating the shopping service. In response, at method operation 9, the shopping service communicates a user interface to the client device, enabling the user to complete a purchase transaction for the selected product.

At method operation 10, the user again interacts via the user interface to provide payment information for completing a purchase transaction for the selected product. At method operation 10, this payment information is communicated from the client device to the server operating the shopping service, or alternatively, to an associated payment service provider that is integrated with the shopping service. When the purchase transaction is successfully completed, and the user's payment has been successfully processed, at method operation 11, the shopping service communicates necessary payment status information to the merchant server associated with the particular physical retail store from which the user purchased the product. This allows the merchant to take action on its end to set aside the product for the user until such time as the user is able to pick up the product from the physical retail store. In addition, at operation 11, a purchase transaction confirmation message is communicated to the client device of the user, to indicate to the user that the product has successfully been purchased. With some embodiments, after sending the purchase transaction confirmation message, a subsequent message may include driving directions to the physical retail store at which the product has been purchased, such that the driving directions are customized for the user to reflect a beginning location requested by the user, such as the user's current location, or a location of the user's choosing. With some embodiments, the driving directions may be included in the purchase confirmation message communicated to the user's client device at operation 11. In other embodiments, the driving directions may be communicated to a mobile device of the user, allowing the user to use the driving directions via a turn-by-turn navigation application residing and executing on the user's global positioning system-enabled mobile device.

Figure 4:
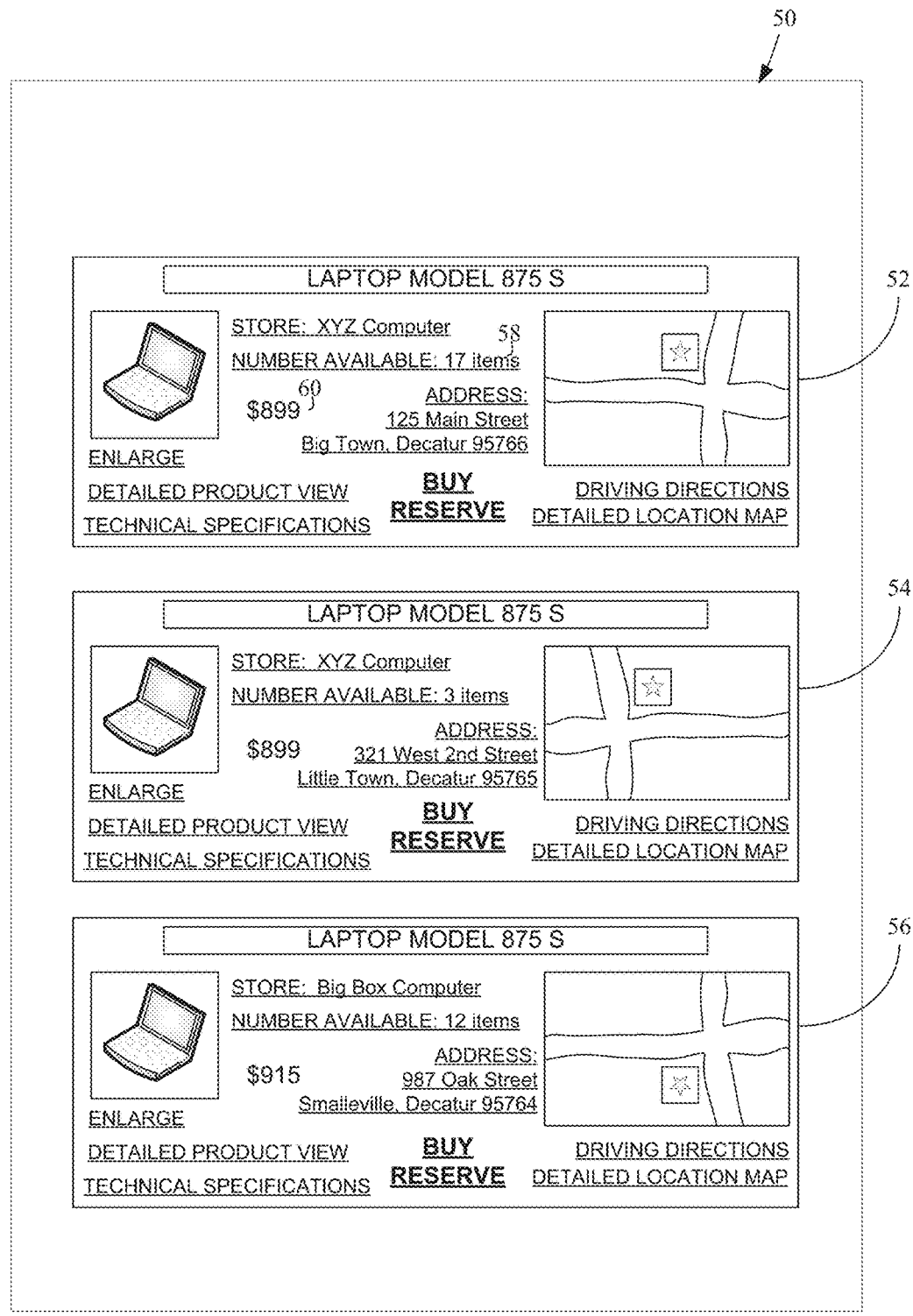
FIG. 4 illustrates an example user interface for use with a comparison shopping and marketplace service, according to some embodiments of the invention.

FIG. 4 illustrates an example of a portion of a user interface 50 for use with a comparison shopping and marketplace service, according to some embodiments of the invention. As shown in FIG. 4, the user interface shows three product listings (e.g., with reference numbers 52, 54 and 56) for a product, referred to as "Laptop Model 875 S". In this example, each product listing is associated with a product being offered at a different physical retail store. For instance, the product listing with reference number 52 is for a product being offered at "XYZ Computer" located at "125 Main Street, Big Town, Decatur 95766." Each product listing shows the number of products available (e.g., at reference number 58) and the price (e.g., at reference number 60) for the product at that particular physical retail store.

With some embodiments, a user can select a button, link, or other interactive user interface element to initiate a process by which the user can purchase the product, or reserve the product. For instance, as shown in FIG. 4, the user interface elements labelled, "BUY" and "RESERVE" enable functionality that allows the user to purchase, or reserve, the product, respectively.

With some embodiments, a map of the location at which the physical store is located is displayed with or in conjunction with the individual product listings. In addition, a user interface element may be available to allow the user to generate driving directions from a user-specified location to the location of the particular physical retail store. With some embodiments, the driving directions may automatically be communicated to a user's mobile device at the completion of a purchase transaction. With some embodiments, one or more user interface elements may be selectable to show a detailed view of the particular product, including more detailed specifications than are shown in the simple product listing.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 5:
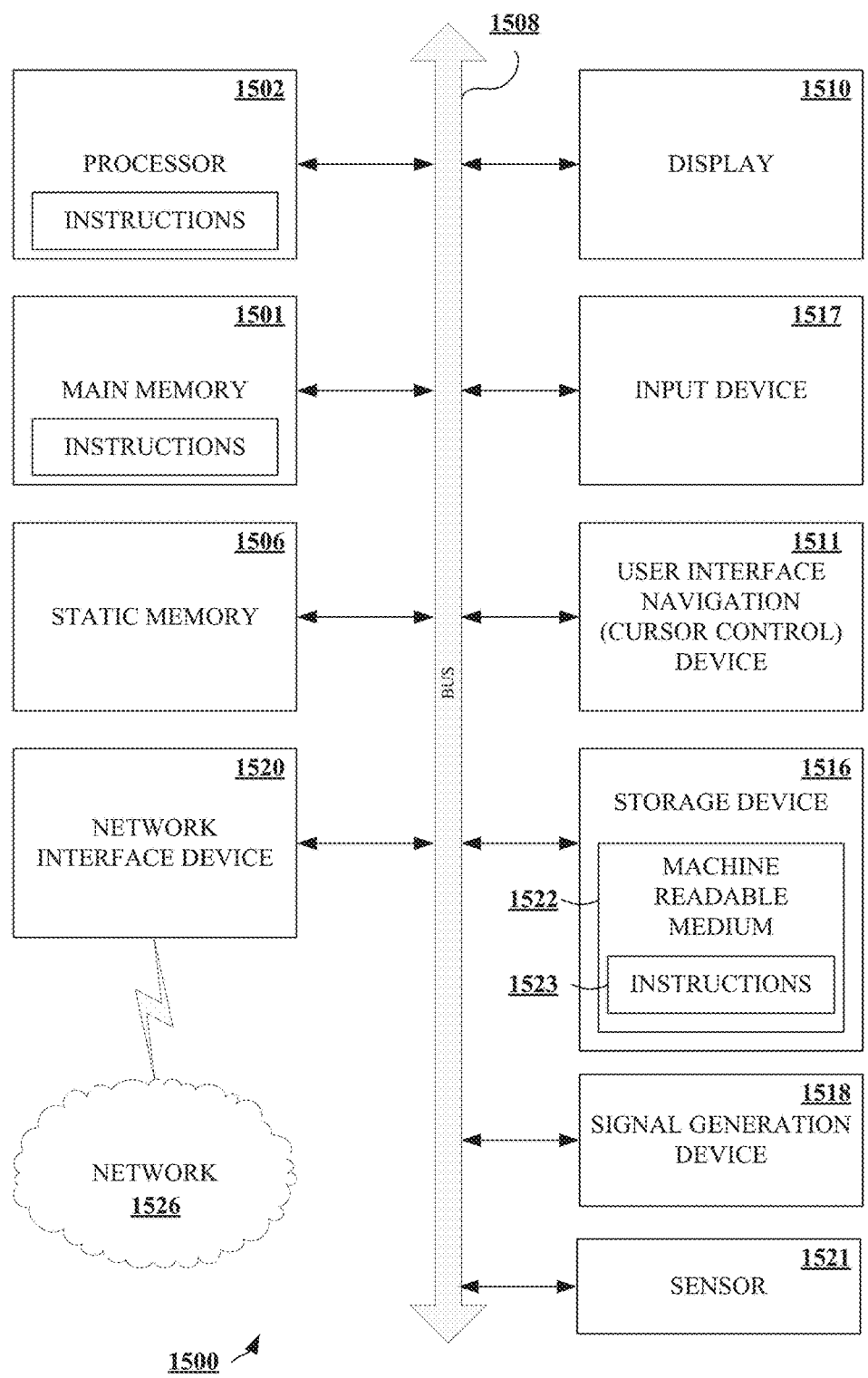
FIG. 5 is a block diagram of a machine in the form of a computing device within which a set of instructions, for causing the machine to perform any one or more of the methodologies discussed herein, may be executed.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi ® and WiMax ® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
   at a server operating a marketplace service, accessing product inventory information based on information from an inventory information acquisition server for a product being offered at two or more physical locations, the product inventory information including a name and location identifier for each of two or more physical locations at which the product is offered and a quantity and a price of the product available for each physical location of the two or more physical locations at which the product is offered;
   communicating, to a client computing device, two or more product listings for the product, each product listing including the product inventory information for the product as offered in at least one of the two or more physical locations and a user-selectable link to a set of driving directions to the respective physical locations;
   receiving, from the client computing device, selection information for purchase of the product offered at a specified location of the two or more physical locations at which the product is offered;
   receiving positioning information, from a hardware-based positioning system of the client computing device, indicating that the client computing device is at the specified location from which the product has been purchased; and
   communicating, to the client computing device, a message comprising information of another product related to the product that has been purchased, the message communicated responsive to the receiving the positioning information.

2. The computer-implemented method of claim 1 further comprising:
   prior to determining the product inventory information for the product, receiving a request, from the client computing device, to display at least one of the product listings for the product; and
   responsive to receiving the request to display from the client computing device, communicating, in real time, a request to the inventory information acquisition server for the product inventory information for the product.

3. The computer-implemented method of claim 2, wherein the request for the product inventory information for the product includes location information indicating one or more of a current location of a user, as specified by the user or as inferred by detecting information associated with the client computing device, or a user-specified location other than the user's current location.

4. The computer-implemented method of claim 3, wherein the received name and location identifier for each of the two or more physical locations at which the product is offered is selected by the inventory information acquisition server for inclusion in the product inventory information for display with the product listing based on a determination that the two or more physical locations at which the product is offered are located within a determinable proximity of an identified location specified in the location information included in the request for the product inventory information.

5. The computer-implemented method of claim 3, wherein the product inventory information received includes product inventory information obtained by the inventory information acquisition server from various server computers associated with the two or more physical locations at which the product is offered.

6. The computer-implemented method of claim 1, further comprising, responsive to receiving the selection information, communicating, to the client computing device, information representing a user interface for enabling a user to conclude the purchase of the product.

7. The computer-implemented method of claim 6, further comprising:
   based on determining that processing of the purchase of the product is completed successfully, communicating a payment status message to a server associated with the specified location, the payment status message identifying the product and indicating that payment for the product is processed.

8. The computer-implemented method of claim 7, further comprising:
subsequent to determining that processing of the purchase transaction for the product is completed successfully, communicating, to a computing device of the user, a message with information including directions for driving to the specified location.

9. The computer-implemented method of claim 1, further comprising, responsive to receiving the selection information, communicating, to the client computing device, information representing a user interface for enabling a user to reserve the product at the specified location.

10. The computer-implemented method of claim 1, wherein the quantity of the product available at each physical location of the two or more physical locations at which the product is offered is specified as a range or as an exact number.

11. The computer-implemented method of claim 1, wherein the client device is a same device as the client computing device.

12. One or more servers comprising:
a processor-implemented data interface module configured to access product inventory information based on information from an inventory information acquisition server for a product being offered at two or more physical locations, the product inventory information including a name and location identifier for each of two or more physical locations at which the product is offered and a quantity and a price of the product available for each of the two or more physical locations at which the product is offered; and
a processor-implemented client-interface module configured to:
communicate, to a client computing device, two or more product listings for the product, each product listing including the product inventory information for the product as offered in at least one of the two or more physical locations and a user-selectable link to a set of driving directions to the respective physical locations;
receive, from the client computing device, selection information for purchase of the product offered at a specified location of the two or more physical locations at which the product is offered,
receive positioning information, from a hardware-based positioning system of the client computing device, indicating that the client computing device is at the specified location from which the product has been purchased, and
communicating, to the client computing device, a message comprising information of another product related to the product that has been purchased, the message communicated in response to receiving the receiving the positioning information.

13. The one or more servers of claim 12, wherein:
the processor-implemented client-interface module is further configured to receive a request from the client device to display at least one of the product listings for the product, and
the processor-implemented data interface module is further configured to communicate, in real time, a request to the inventory information acquisition server for the product inventory information for the product, in response to the processor-implemented client-interface module receiving the request to display the product listing from the client computing device.

14. The one or more servers of claim 13, wherein the request for the product inventory information that is communicated to the inventory information acquisition server includes location information indicating one or more of a current location of a user, a user-specified location, or a location of a client computing device.

15. The one or more servers of claim 14, wherein the received name and location identifier for each of the two or more physical locations at which the product is offered is selected for inclusion in the product inventory information for display with the product listing based on a determination that the two or more physical locations at which the product is offered are located within a determinable proximity of an identified location specified in the location information included in the request for the product inventory information that is communicated to the inventory information acquisition server.

16. The one or more servers of claim 14, wherein the product inventory information includes product inventory information obtained by the inventory information acquisition server from various server computers associated with the two or more physical locations at which the product is offered.

17. The one or more servers of claim 12, wherein the processor-implemented client-interface module is further configured to, responsive to receiving the selection information, communicate, to the client computing device, information representing a user interface for enabling a user to conclude the purchase of the product.

18. The one or more servers of claim 17, further comprising:
a transaction processing module configured to process the purchase of the product, and to communicate a payment status message to a server computer associated with an entity operating the specified location from which the product is purchased, the payment status message indicating that payment for the product is processed.

19. The one or more servers of claim 17, further comprising:
a processor-implemented module configured to communicate, to a user-specified address, a message including directions for driving from a physical location of the user to the specified location.

20. One or more servers having one or more processors configured to execute instructions stored in memory, the instructions, when executed, to cause the one or more processor to perform operations comprising:
at a server operating a marketplace service, accessing product inventory information based on information from an inventory information acquisition server for a product being offered at two or more physical locations, the product inventory information including a name and location identifier for each of two or more physical locations at which the product is offered and a quantity and a price of the product available for each of the two or more physical locations at which the product is offered;
communicating, to a client computing device, two or more product listings for the product, the product listing including the product inventory information for the product as offered in at least one of the two or more physical locations and a user-selectable link to a set of driving directions to the respective physical locations;

receiving, from the client computing device, selection information for purchase of the product offered at a specified location of the two or more physical locations at which the product is offered;

receiving positioning information, from a hardware-based positioning system of the client computing device, indicating that the client computing device is at the specified location from which the product has been purchased; and communicating, to the client computing device, a message comprising information of another product related to the product that has been purchased, the message communicated responsive to the receiving the positioning information.

\* \* \* \* \*

UNITED STATES PATENT AND TRADEMARK OFFICE
CERTIFICATE OF CORRECTION

PATENT NO. : 10,402,884 B2
APPLICATION NO. : 14/745990
DATED : September 3, 2019
INVENTOR(S) : Jeffrey Wong et al.

Page 1 of 1

It is certified that error appears in the above-identified patent and that said Letters Patent is hereby corrected as shown below:

On the Title Page

Item (56), in Column 2, under "Other Publications", Line 1, delete "retailerswith" and insert -- retailers with --, therefor.

In the Claims

In Column 13, Lines 56-57, in Claim 12, delete "receiving the receiving the" and insert -- receiving the --, therefor.

Signed and Sealed this
Twenty-first Day of July, 2020

Andrei Iancu
*Director of the United States Patent and Trademark Office*